United States Patent
Borzabadi

(10) Patent No.: US 7,244,895 B1
(45) Date of Patent: Jul. 17, 2007

(54) ELECTRICAL FEEDTHROUGH FOR VARIED ENVIRONMENTAL CONDITIONS

(75) Inventor: Hamid R. Borzabadi, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/416,268

(22) Filed: May 2, 2006

(51) Int. Cl.
H02G 3/18 (2006.01)

(52) U.S. Cl. .................. 174/650; 174/652; 174/656; 174/659; 248/56; 439/930

(58) Field of Classification Search .......... 174/650, 174/652, 656, 659, 662, 668, 669, 153 G, 174/153 R, 152 R, 152 G, 151, 135; 248/56; 16/2.1, 2.2; 439/638, 930, 551
See application file for complete search history.

(56) References Cited

U.S. PATENT DOCUMENTS

| 2,672,500 | A | * | 3/1954 | Bondon | 174/153 R |
| 2,813,692 | A | * | 11/1957 | Peterson et al. | 174/152 R |
| 3,803,531 | A | * | 4/1974 | Sorensen | 174/151 |
| 4,088,381 | A | * | 5/1978 | Harnett | 174/151 |
| 4,096,352 | A | * | 6/1978 | von Zweck | 174/153 R |
| 5,170,017 | A | * | 12/1992 | Stanevich et al. | 174/151 |
| 6,146,207 | A | * | 11/2000 | Mulot | 439/638 |
| 6,501,025 | B2 | * | 12/2002 | Tilli et al. | 174/151 |
| 6,835,093 | B1 | * | 12/2004 | Griffin et al. | 439/551 |

* cited by examiner

Primary Examiner—Angel R. Estrada
(74) Attorney, Agent, or Firm—Jimmy L. Funke

(57) ABSTRACT

A cost efficient electrical feedthrough is provided for forming a hermetic seal with a container and allowing a desired number of inputs to be connected between varied environmental conditions. The electrical feedthrough can be employed for environmental conditions including high pressures, high temperatures, low temperatures and the presence of corrosive gases. A first wire situated in a first environmental condition and a second wire situated in a second environmental condition are connected via a conducting material. The first environmental condition and the second environmental condition are separated by a divider having an opening for passing therethrough either the first wire or the second wire. A first seal extends from the divider to a material in contact with the conducting material. In an aspect, a second seal forms an enclosed area with the conducting material for surrounding a wire engaging hole and any wire extended therethrough and sealing the first environmental condition from the second environmental condition.

11 Claims, 5 Drawing Sheets

ELECTRICAL FEEDTHROUGH FOR VARIED ENVIRONMENTAL CONDITIONS

FIELD OF THE INVENTION

The invention relates generally to an electrical feedthrough, and more particularly to a cost efficient and hermetically sealed electrical feedthrough between varied environmental conditions.

BACKGROUND OF THE INVENTION

Electrical feedthrough assemblies provide a conductive path extending between the interior of a hermetically sealed container and a point outside the container. Electrical feedthroughs are utilized by many industries for avoiding any leakage of gases or fluids. Industries requiring an electrical feedthrough include the aerospace industry, telecommunication industry, semiconductor industry, medical device industry with respect to implantable devices, and automotive industry for systems including fuel pumps, transmissions, process controls, and marine systems. Scientific instruments of all types also require an electrical feedthrough between varied environmental conditions. As an example, in a laboratory environment, a pressurized chamber is typically used for product evaluation of a pressure sensor for automotive or industrial applications. Since a pressurized chamber is often used to test various parts, numerous connections must be established with a device situated outside the pressurized chamber.

In order to communicate with or power a unit being evaluated, a high pressure feedthrough is often required. With so many applications, a varied number and varied type or size of input/output connections are required. As such, contemporary feedthrough devices are commonly custom made to order and are relatively expensive. Contemporary feedthrough devices for pressurized chambers typically contain about twenty input/output connection wires. As the number of inputs and outputs increase, the costs of the feedthrough devices increase, with a significant cost increase at about one hundred input/output connections. Further, the size limitation of contemporary feedthrough devices can dictate the size and construction design of a pressurized chamber. These limitations place undesirable restrictions on the pressurized chamber design.

Environmental conditions including high temperatures and the presence of a corrosive gas can further limit the design of an electrical feedthrough. Feedthrough corrosion may be, and often is encountered with contemporary devices. The corrosion can ultimately compromise a seal, resulting in leakage between the necessary separate environmental conditions.

SUMMARY OF THE INVENTION

A method and apparatus is provided for forming a conductive path extending between an interior of a hermetically sealed container and a point outside the container. Numerous applications, product evaluations and scientific instruments can utilize the present invention including medical devices, aerospace devices, marine devices, telecommunication devices, semiconductor devices, automotive devices and other devices requiring a hermetically sealed connection between two varied environmental conditions. The conductive path can be used for input or output of current or communications and the like.

A cost efficient electrical feedthrough is formed allowing input and output flexibility for various applications. The electrical feedthrough forms a hermetic seal with the container and allows a desired number of input and outputs to be connected between the two varied environmental conditions. Additional or less inputs and outputs can be connected as desired using the same electrical feedthrough apparatus, the apparatus supplying connections available for optional use. Further, the electrical feedthrough can be effectively employed with and withstand environmental conditions including high pressures, high temperatures, low temperatures and the presence of corrosive gases.

Features of the invention are achieved in part by connecting a first wire at a site exposed to a first environmental condition to a second wire at a site exposed to a second environmental condition via a conducting material. The first environmental condition and the second environmental condition are separated by a divider having an opening for passing therethrough either the first wire or the second wire. A first seal extends from the divider to a material in contact with the conducting material, for hermetically sealing apart the two varied environmental conditions. The first wire, the conducting material and the second wire may transmit current or a communication to a device within either the site exposed to the first environmental condition or the site exposed to the second environmental condition.

In an embodiment, a wire engaging hole extends through the conducting material, for receiving either the first wire or the second wire. A second seal forms an enclosed area with a portion of the conducting material for surrounding the wire engaging hole and a wire extended therethrough and sealing the site exposed to the first environmental condition from the site exposed to the second environmental condition. The second seal includes a housing formed of either metal or a high temperature grade thermoplastic. In an embodiment, the conducting material comprises a high temperature laminate substrate.

Other features and advantages of this invention will be apparent to a person of skill in the art who studies the invention disclosure. Therefore, the scope of the invention will be better understood by reference to an example of an embodiment, given with respect to the following figures.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE INVENTION

Exemplary embodiments are described with reference to specific configurations. Those of ordinary skill in the art will appreciate that various changes and modifications can be made while remaining within the scope of the appended claims. Additionally, well known elements, devices, components, methods, process steps and the like may not be set forth in detail in order to avoid obscuring the invention. Further, unless indicated to the contrary, the numerical values set forth in the following specification and claims are approximations that may vary depending upon the desired characteristics sought to be obtained by the present invention.

A method and apparatus are described herein for providing a cost efficient and hermetically sealed electrical feedthrough between varied environmental conditions. Numerous applications, product evaluations and scientific instruments can utilize the present invention including medical devices, aerospace devices, marine devices, telecommunication devices, semiconductor devices, automotive devices and other devices requiring a hermetically sealed connection between two varied environmental conditions.

Figure 1:
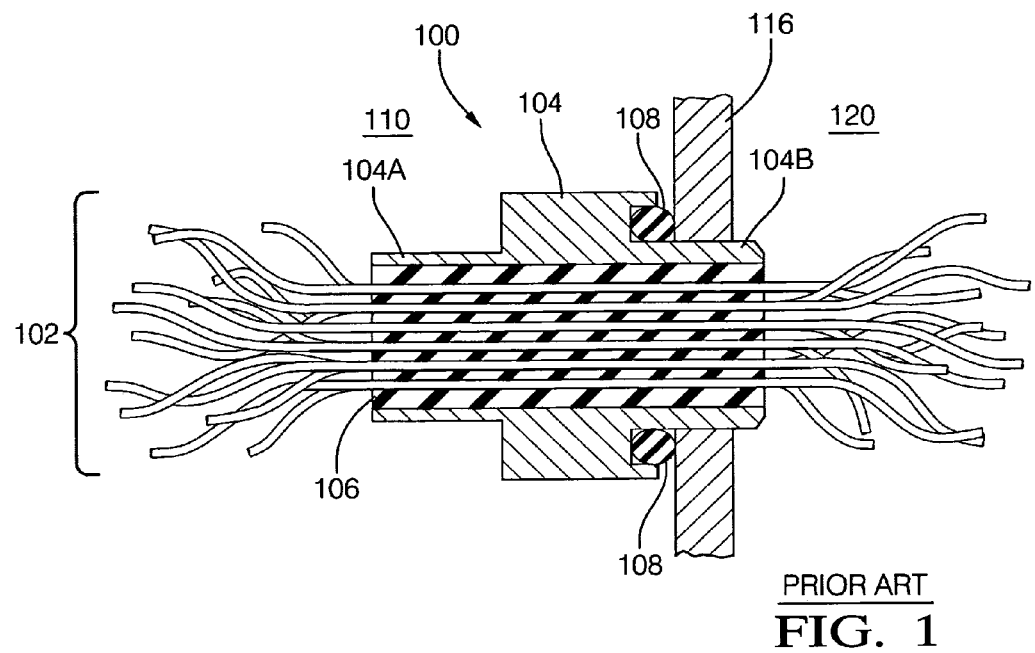
FIG. 1 is a sectional side view of a contemporary electrical feedthrough extending between the interior of a sealed container and a point outside the container.

Referring to the drawings wherein identical reference numerals denote the same elements throughout the various views, FIG. 1 is a sectional side view of a contemporary electrical feedthrough 100 extending between the interior of a sealed container and a point outside the container. Two varied environmental conditions are shown, namely, environmental condition 110 and environmental condition 120. As an example, environmental condition 110 represents the ambient environmental condition, while environmental condition 120 represents a higher pressure area contained within container boundary 116. Contemporary electrical feedthrough 100 includes plate 104 having plate end 104a for receiving wires 102 and plate end 104b for fitting to an opening within container boundary 116. It is to be appreciated that plate end 104b must fit accurately within container boundary 116, often requiring a custom fit. Seal 108 extends from a portion of plate 104 to container boundary 116 to seal environmental condition 110 from environmental condition 120. Wires 102 are inserted into feed paths 106 and extend from environmental condition 110 through contemporary electrical feedthrough 100 to environmental condition 120.

As discussed infra in the Background, this form of contemporary electrical feedthrough device is usually custom made to order and relatively expensive, typically including about twenty input/output connection wires. Each input/output connection wire requires tooling of feed paths 106 to seal individual input/output connection wires, which increases the cost of the contemporary electrical feedthrough device.

Figure 2:
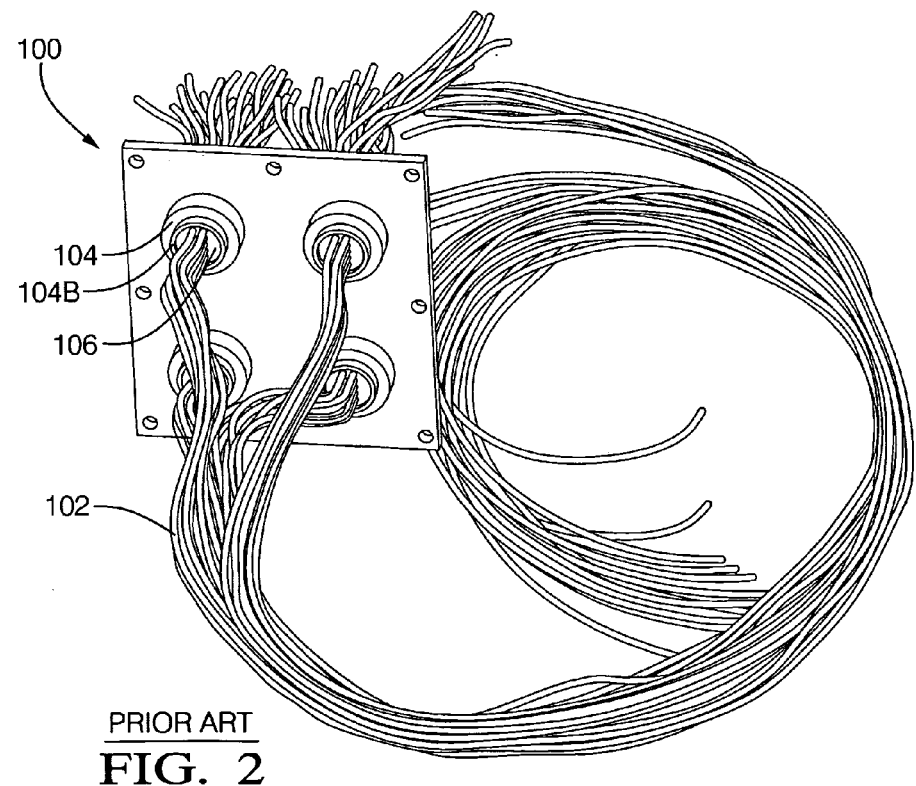
FIG. 2 is a perspective view of a contemporary electrical feedthrough as in FIG. 1 showing wires extending therethrough.

FIG. 2 is a perspective view of a contemporary electrical feedthrough as in FIG. 1 showing wires extending therethrough. Plate 104 includes four separate plate ends 104b for fitting to an opening within container boundary 116, giving rise to four potential leakage areas between environmental conditions 110 and 120. Seal 108 extends from plate 104 to container boundary 116 (not shown). A separate seal 108 is utilized for each separate plate end 104b that fits to the opening within container boundary 116. Each separate seal 108 represents a potential leakage area.

Each plate end 104b receives a specific number of wires 102 within feed paths 106. The feed paths 106 also represent potential leakage areas, given that wires 102 extend from environmental condition 110 to environmental condition 120.

Figure 3:
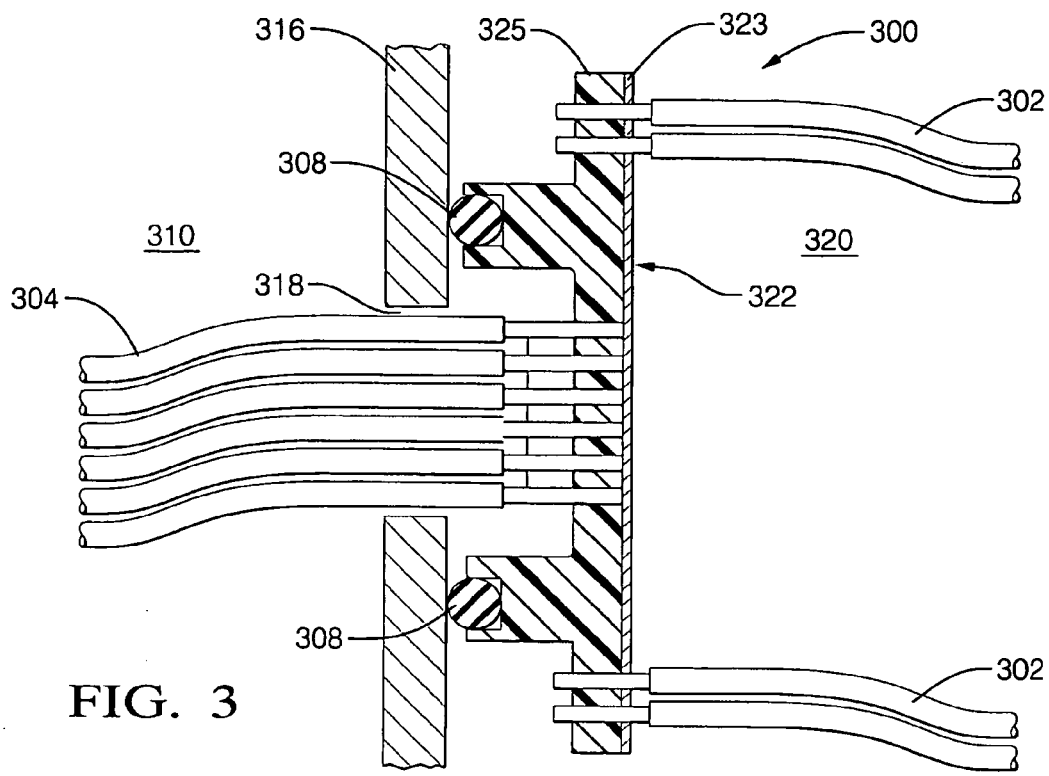
FIG. 3 is a sectional side view of an electrical feedthrough extending between the interior of a sealed container and a point outside the container, in accordance with an embodiment of the present invention.

Referring to FIG. 3, a sectional side view of an electrical feedthrough 300 is shown extending between the interior of a sealed container and a point outside the container, in accordance with an embodiment of the present invention. The electrical feedthrough 300 hermetically seals environmental condition 310 from environmental condition 320 such that there is no detectable leakage of air pressure, gases, fluids, etc. Electrical feedthrough 300 also forms a conductive path extending from environmental condition 310 to environmental condition 320. The conductive path includes wire 302, conductor 323 and wire 304. Wire 302 and wire 304 are connected via conductor 323. Wire 302, wire 304, and conductor 323 may transmit current or a communication to a device within either the site exposed to environmental condition 310 or the site exposed to environmental condition 320.

As shown, wire 302 is exposed to environmental condition 320, and wire 304 is exposed to environmental condition 310. Electrical feedthrough 300 can effectively withstand environmental conditions including high pressures, high temperatures, low temperatures and the presence of corrosive gases. In an embodiment, a high temperature laminate substrate 322 for enduring any high temperature exposure from an environmental condition. Various high temperature laminate substrate materials may be utilized including FR-4 material comprising conductor 323 disposed on a polymeric board 325.

It is to be appreciated that wire 302 and wire 304 can include a wire, cable or other connector, and can include one or more than one wire, cable or connector. As described infra, by "first wire" it is meant one or more than one wire, cable or connector. The word "first" is used to identify the position of the wire at a site exposed to a first environmental condition. Similarly, by "second wire" it is meant one or more than one wire, cable or connector. The word "second" is used to identify the position of the wire at a site exposed to a second environmental condition.

Electrical feedthrough 300 is formed for allowing input and output flexibility for various applications. Available and optional connections for receiving wires 302 and 304 are formed within the substrate 322. As such, a desired number of wires 302 and wires 304 can be connected between the environmental conditions 310 and 320. Environmental condition 310 and environmental condition 320 are separated by divider 316 having opening 318 for passing therethrough either wires 302 or wires 304. Since a desired number of wires 302 and 304 may be connected extending through opening 318, a gap between wires 304 and divider 316 may be formed through opening 318 by the absence of wires. A gap is allowable since electrical feedthrough 300 is sealed outside of the gap. That is, a seal 308 extends from divider 316 to substrate 322, for hermetically sealing apart the two varied environmental conditions 310 and 320.

Figure 4:
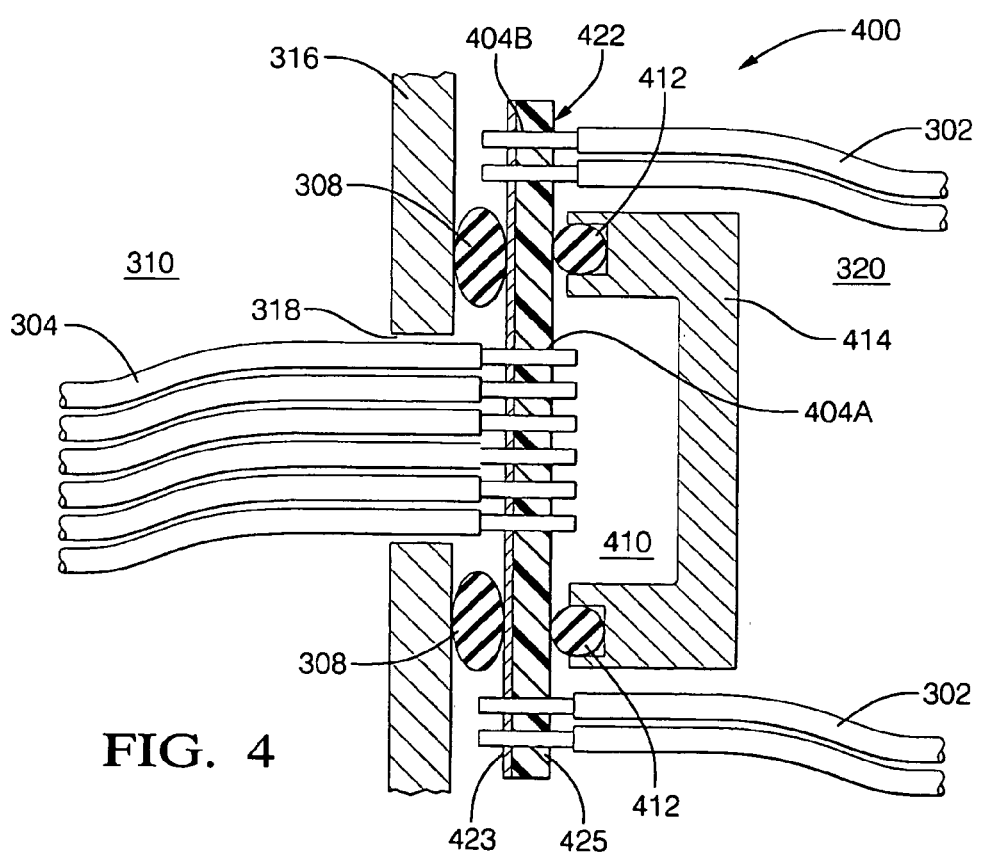
FIG. 4 is a sectional side view of an electrical feedthrough as in FIG. 3, further including a housing and respective seal for sealing wire engaging holes, in accordance with an embodiment of the present invention.

FIG. 4 is a sectional side view of an electrical feedthrough as in FIG. 3, further including a housing 414 and respective seal 412, in accordance with an embodiment of the present invention. In an embodiment, wire engaging holes 404A extend through a laminate substrate 422 comprising a conductor 423 on a polymeric board 425 for providing optional connections for receiving wires 304. As such, wire engaging holes 404A maintain an opening from environmental condition 310 to area 410. Area 410 maintains the same environmental conditions as environmental condition 310. Housing 414 and seal 412 form area 410 with a portion of laminate substrate 422 for surrounding the wire engaging holes 404A and any wires 304 extending therethrough and sealing the first environmental condition 310 from the second environmental condition 320.

Housing 414 can be formed of a variety of materials including metal or thermoplastic. The thermoplastic can be formed by injection mold, saving costs. Housing 414 can be formed of a high temperature thermoplastic for high temperature environmental applications. Useful high temperature thermoplastics are available for withstanding high temperatures such as 100 degrees Celsius.

Figure 5:
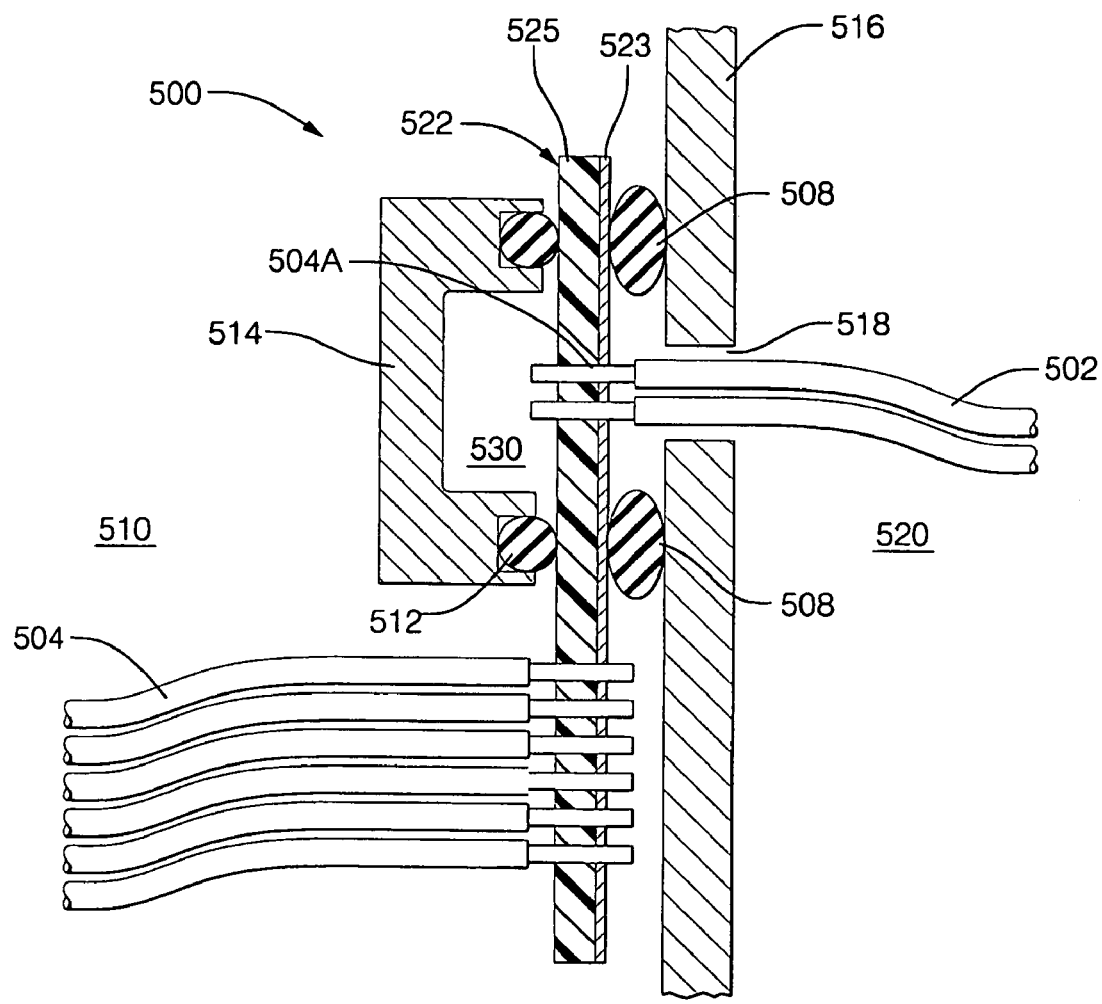
FIG. 5 is a sectional side view of an electrical feedthrough extending between the interior of a sealed container and a point outside the container, providing a varied positioning as compared to the positioning shown in FIG. 3, in accordance with an embodiment of the present invention.

FIG. 5 shows a sectional side view of an electrical feedthrough extending between the interior of a sealed container and a point outside the container, providing a varied positioning as compared to the positioning shown in FIG. 3, in accordance with an embodiment of the present invention. As described in FIG. 3 and FIG. 4, wires 304 enter environmental condition 310 within the sealed container opening. However, in the embodiment illustrated in FIG. 5, the electrical feedthrough 500 apparatus is situated within environmental condition 510 within the sealed container (i.e., a high pressure environment) and wires 502 extend through opening 518 to environmental condition 510. Electrical feedthrough 500 further includes housing 514 (enclosing area 530), a laminate substrate comprising conductor 523 on board 525, and seal 512 when wire engaging holes 504A extend completely through laminate substrate 522 for receiving wires 502.

Figure 6:
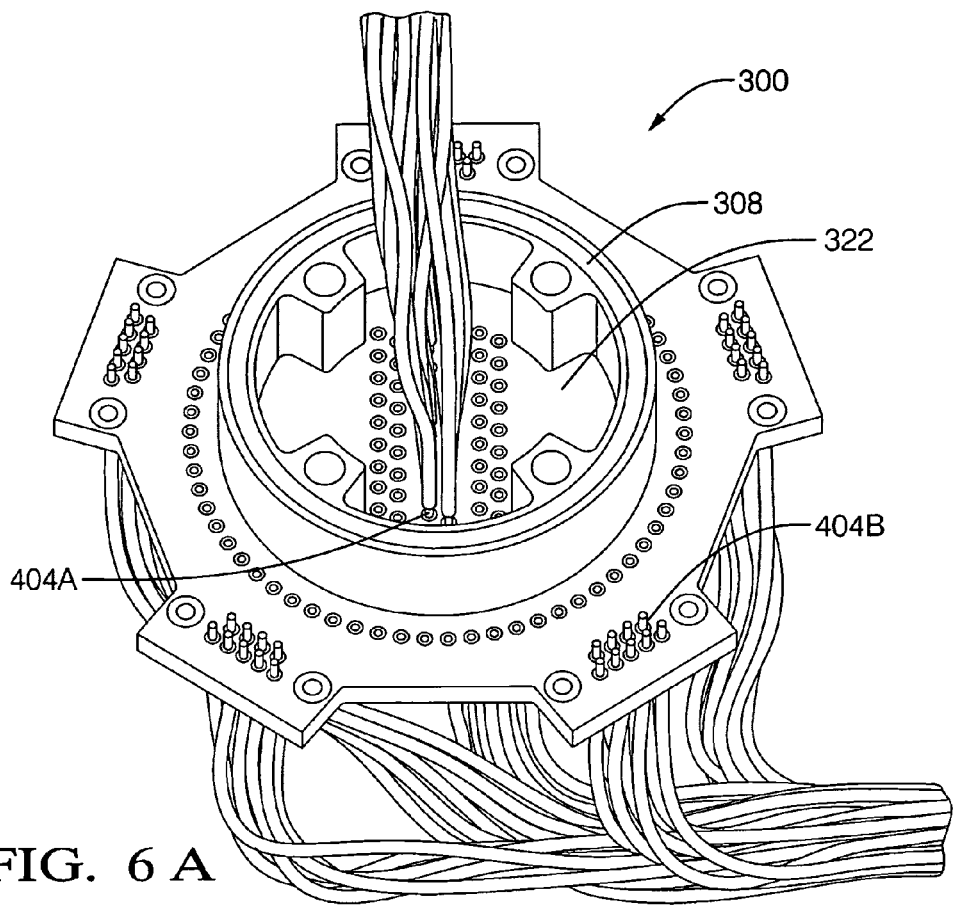
FIG. 6A is an inside perspective view of an electrical feedthrough, in accordance with an embodiment of the present invention.
FIG. 6B is an outside perspective view of an electrical feedthrough, including a housing for sealing wire engaging holes, in accordance with an embodiment of the present invention.
FIG. 6C is an inside perspective view of electrical feedthrough 300 and the housing for sealing wire engaging holes as shown in FIG. 6B, in accordance with an embodiment of the present invention.
Figure 6:
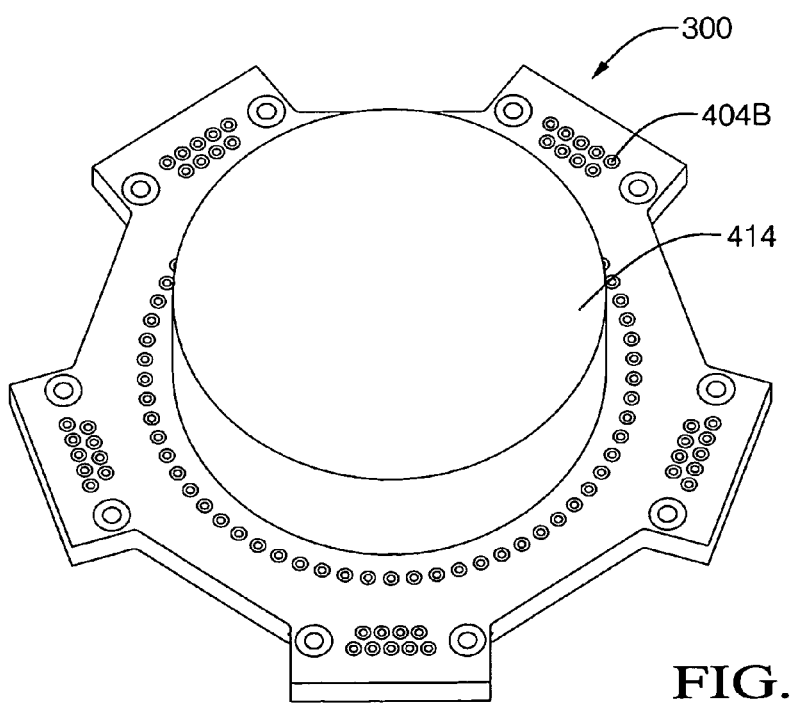

Referring to FIG. 6A, an inside perspective view is shown of an electrical feedthrough 300, in accordance with an embodiment of the present invention. Electrical feedthrough 300 is shown in a circular shape but it is to be appreciated that other shapes including rectangular and irregular shapes can be further employed. As illustrated, seal 308 extends about wires 304, hermetically sealing environmental condition 310 from environmental condition 320. The wire engaging holes 404A and 404B are illustrated within laminate substrate 322, providing optional connections for wires 304 and wires 302, respectively.

FIG. 6B is an outside perspective view of an electrical feedthrough 300, including a housing 414 for sealing wire engaging holes 404A, in accordance with an embodiment of the present invention. As illustrated, housing 414 and seal 412 surround the wire engaging holes 404A and any wires 304 extending therethrough and hermetically seal the first environmental condition 310 from the second environmental condition 320.

Figure 6C:
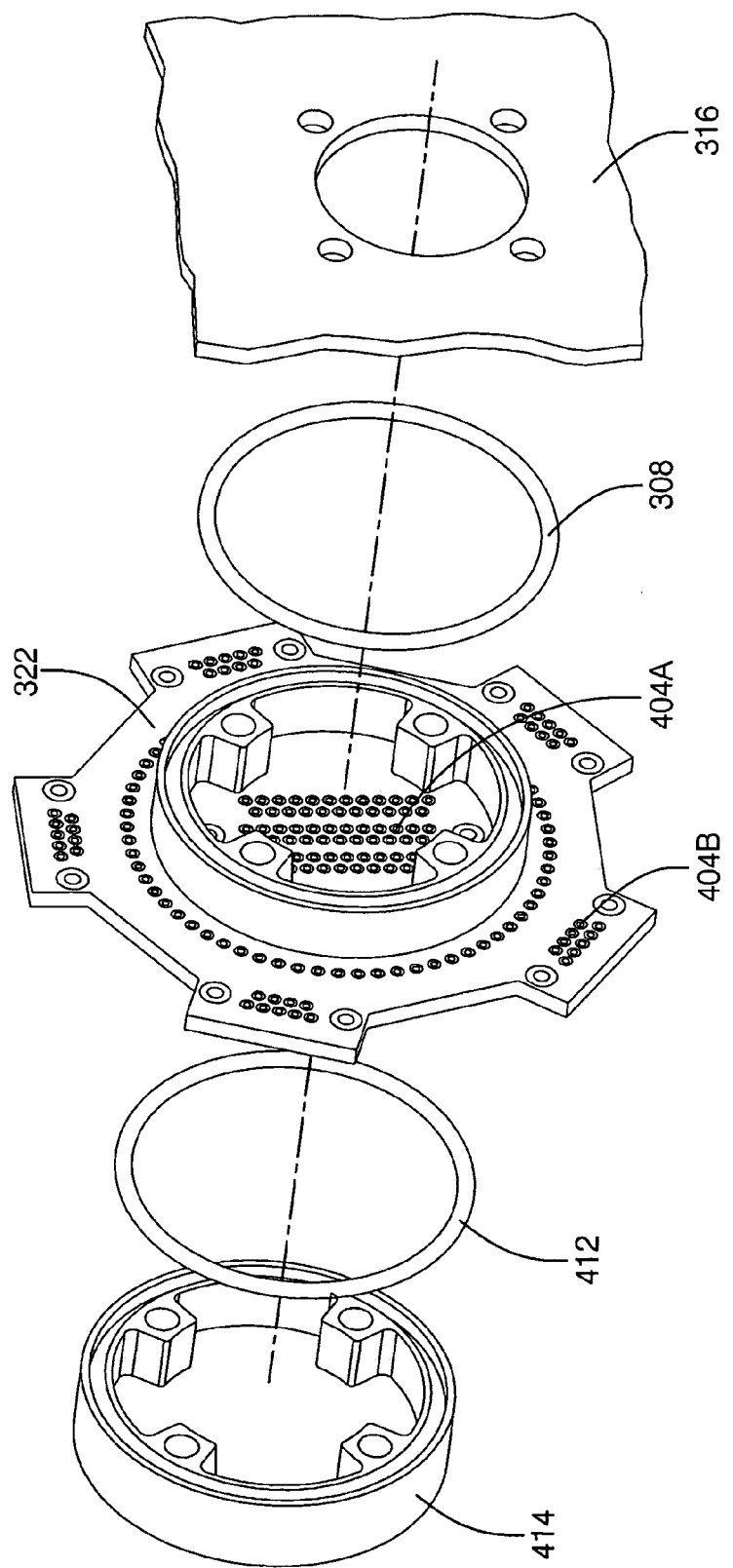

FIG. 6C is an inside perspective view of electrical feedthrough 300 and the housing 414 for sealing wire engaging holes 404A as shown in FIG. 6B, in accordance with an embodiment of the present invention. Seal 412 surrounds wire engaging holes 404A and any wires 304 extending therethrough, hermetically sealing environmental condition 310 from environmental condition 320. As illustrated, area 410 (FIG. 4) provides sufficient depth and area for receiving wires 304 extended through laminate substrate 322.

Other features and advantages of this invention will be apparent to a person of skill in the art who studies this disclosure. Thus, exemplary embodiments, modifications and variations may be made to the disclosed embodiments while remaining within the spirit and scope of the invention as defined by the appended claims.

I claim:

1. An apparatus for electrical feedthrough comprising:
a laminate substrate comprising a conducting material for connecting a first wire at a site exposed to a first environmental condition and a second wire at a site exposed to a second environmental condition, wherein the conducting material links the first wire and the second wire, and wherein the first environmental condition and the second environmental condition are separated by a divider defining an opening for passing therethrough one of the first wire and the second wire; and
a first seal extending from the divider to the conducting material, for sealing the site exposed to the first environmental condition from the site exposed to the second environmental condition;
a first wire engaging hole defined by and extending through the laminate substrate, wherein the first wire extends via the first wire engaging hole through the conducting material,
a second seal forming an enclosed area with a portion of the laminate substrate for surrounding the wire engaging hole and the first wire extended therethrough and for sealing the site exposed to the first environmental condition from the site exposed to the second environmental condition, wherein the second seal includes a housing formed of one of metal and a thermoplastic, wherein the thermoplastic withstands a temperature of 100 degrees Celsius;
a second wire engaging hole defined by and extending through the laminate substrate, wherein the second wire extends via the second wire engaging hole through the conducting material.

2. The apparatus for electrical feedthrough as in claim 1, wherein the first wire, the conducting material and the second wire transmit current to a device within one of the site exposed to the first environmental condition and the site exposed to the second environmental condition.

3. The apparatus for electrical feedthrough as in claim 1, wherein the first wire, the conducting material and the second wire transmit a communication to a device within one of the site exposed to the first environmental condition and the site exposed to the second environmental condition.

4. The apparatus for electrical feedthrough as in claim 1, wherein the site exposed to the first environmental condition experiences a higher atmospheric pressure relative to the site exposed to the second environmental condition.

5. The apparatus for electrical feedthrough as in claim 1, wherein the site exposed to the first environmental condition contains a corrosive gas.

6. An apparatus for electrical feedthrough comprising:
a laminate substrate comprising a conducting material for connecting a first wire at a site exposed to a first environmental condition and a second wire at a site exposed to a second environmental condition, wherein the conducting material links the first wire and the second wire, and wherein the first environmental condition and the second environmental condition are separated by a divider defining an opening for passing therethrough one of the first wire and the second wire; and a first seal extending from the divider to at least one of the conducting material, a material in contact with the conducting material, the first wire and the second wire, for sealing the site exposed to the first environmental condition from the site exposed to the second environmental condition;

a first wire engaging hole defined by and extending through the laminate substrate, wherein the first wire extends via the first wire engaging hole through the conducting material, a second seal forming an enclosed area with a portion of the laminate substrate for surrounding the wire engaging hole and the first wire extended therethrough and for sealing the site exposed to the first environmental condition from the site exposed to the second environmental condition;

a second wire engaging hole defined by and extending through the laminate substrate, wherein the second wire extends via the second wire engaging hole through the conducting material, wherein the second seal includes a housing formed of one of metal and a thermoplastic, and wherein the conducting material comprises a high temperature laminate substrate.

7. The apparatus for electrical feedthrough as in claim 6, wherein the first wire, the conducting material and the second wire transmit one of a current and a communication to a device within one of the site exposed to the first environmental condition and the site exposed to the second environmental condition.

8. The apparatus for electrical feedthrough as in claim 6, wherein the site exposed to the first environmental condition experiences a higher atmospheric pressure relative to the site exposed to the second environmental condition.

9. A method of forming a hermetically sealed electrical feedthrough comprising:

providing a laminate substrate comprising a conductive material disposed on a polymeric board;

connecting a first wire to the conducting material at a site exposed to a first environmental condition;

connecting a second wire to the conducting material at a site exposed to a second environmental condition, wherein the conducting material links the first wire and the second wire;

separating the first environmental condition and the second environmental condition by a divider defining an opening for passing therethrough one of the first wire and the second wire; and extending a first seal from the divider to the laminate substrate for sealing the site exposed to the first environmental condition from the site exposed to the second environmental condition;

defining a first wire engaging hole extending through the laminate substrate wherein the first wire extends therethrough; and forming an enclosed area with a portion of the laminate substrate for surrounding the first wire engaging hole and the first wire extended therethrough and sealing the site exposed to the first environmental condition from the site exposed to the second environmental condition, utilizing a second seal;

forming a housing to the second seal wherein the housing is formed of one of metal and a thermoplastic, and wherein the thermoplastic withstands a temperature of 100 degrees Celsius.

10. The method as in claim 9, wherein the site exposed to the first environmental condition experiences a higher atmospheric pressure relative to the site exposed to the second environmental condition.

11. The method as in claim 9, wherein the first wire, the conducting material and the second wire transmit one of a current and a communication to a device within one of the site exposed to the first environmental condition and the site exposed to the second environmental condition.

* * * * *